United States Patent [19]

Sugahara et al.

[11] Patent Number: 5,173,952
[45] Date of Patent: Dec. 22, 1992

[54] IMAGE FILTERING SYSTEM PERFORMING TRANSFORM CODING OF IMAGE DATA OTHER THAN BOUNDARY PICTURE ELEMENTS OF ADJOINING BLOCKS

[75] Inventors: Takayuki Sugahara, Yokosuka; Ichiro Ando, Yokohama, both of Japan

[73] Assignee: Victor Company of Japan, Ltd., Yokohama, Japan

[21] Appl. No.: 672,242

[22] Filed: Mar. 20, 1991

[30] Foreign Application Priority Data

Mar. 20, 1990 [JP] Japan .................................. 2-72926

[51] Int. Cl.$^5$ ............................................. G06K 9/40
[52] U.S. Cl. ...................................... 382/54; 382/43; 358/432; 358/433
[58] Field of Search ............................ 382/43, 54, 56; 358/133, 135, 432, 433

[56] References Cited

U.S. PATENT DOCUMENTS

| | | | |
|---|---|---|---|
| 4,691,329 | 9/1987 | Juri et al. | 382/43 |
| 4,703,349 | 10/1987 | Bernstein | 382/43 |
| 4,776,030 | 10/1988 | Tzou | 358/432 |
| 4,920,426 | 4/1990 | Hatori et al. | 358/433 |
| 5,051,840 | 9/1991 | Watanabe et al. | 358/432 |

FOREIGN PATENT DOCUMENTS

272794 6/1988 European Pat. Off. .

OTHER PUBLICATIONS

IEEE/IEICE Global Telecommunications Conference, vol. 1, Nov. 15, 1987, Tokyo pp. 453-457; Tamitani et al.: 'A Real-Time Video Signal Processor Suitable for Motion Picture Coding Applications'* p. 453, col. 1, line 1-line 30 * * p. 453, col. 2, line 14-p. 454, col. 1, line 58, paragraph 1 * * p. 455, col. 1, line 17-line 74; FIG. 4 * * p. 456, col. 1, line 76-p. 457, col. 1, line 18; FIGS. 7, 8*.

Primary Examiner—Jose Couso
Attorney, Agent, or Firm—Lowe, Price, LeBlanc & Becker

[57] ABSTRACT

An image filtering system includes a storage device for storing image data which are partitioned into blocks composed of a predetermined number of picture elements for an orthogonal transform and represent an entire input image therein, an address selecting device for selecting addresses of the storage device, from which image data corresponding to respective predetermined object regions of a frame and stored at the selected addresses are read, and a sum-of-products calculating device for multiplying each of the image data of picture elements read out of the storage device by a corresponding coefficient of an operator, which is comprised of a predetermined number of coefficients, for adding up the thus obtained products for each of the object regions and for outputting a sum signal representing a sum of the products for each of the object regions. In the image filtering system, the address selecting device selects the addresses such that a storage area of the storage device corresponding to each of the object regions does not spread over adjoining ones of the blocks. Thereby, there is prevented occurrence of a block noise originating from a block in which motion compensation is not appropriately performed. Consquently, a prediction error of a quantity of codes can be substantially decreased.

2 Claims, 3 Drawing Sheets 5,173,952

1

IMAGE FILTERING SYSTEM PERFORMING TRANSFORM CODING OF IMAGE DATA OTHER THAN BOUNDARY PICTURE ELEMENTS OF ADJOINING BLOCKS

BACKGROUND OF THE INVENTION

1. Field of The Invention

This invention generally relates to an image processing and more particularly to an image filtering system suitable for predicting a quantity of codes included in a frame, for example, in case of performing compression of image data representing a color image in blocks, each of which is composed of a predetermined number of picture elements.

2. Description of The Related Art

Generally, when effecting compression of image data representing a color image, the image data are first partitioned into blocks each of which is comprised of a predetermined number of picture elements. Further, data of each block are then transformed by using an orthogonal transform. Subsequently, the transformed data are quantized. Thereafter, either zero run length coding or Huffman coding is performed on the quantized data. Alternatively, both of zero run length coding or Huffman coding are performed on the quantized data.

In case of performing compression of data representing a moving picture, a conventional image filtering system employs the following method. Namely, in case of this conventional method, for example, as illustrated in FIG. 4, one segment is made up of a plurality of frames (four frames in this case). Further, in this conventional method, a frame (hereunder referred to as an intra-frame) on which intra-frame compression is performed is employed as one of the four frames of a segment. Moreover, three frames (hereunder referred to as first to third inter-frames), each of which is composed of difference data representing differences between picture elements of a motion-compensated frame and corresponding picutre elements of the intra-frame, are employed as the other frames of the segment.

In case of performing compression of data of frames in this manner, a quantity of information regarding frequency (i.e., a quantity of codes) included in each frame is predicted by performing a filtering processing of data contained in each frame and computing a sum of absolute values of results of the filtering processing. Then, a quantization step and a band-limited value which correspond to the predicted value of the quantity of codes are established. Subsequently, a band-limitation of the data included in each frame is effected by using the established band-limited value. Thereafter, the band-limited data are orthogonally transformed in blocks, and further the transformed data are quantized by using the established quantization step. Thereby, a quantity of codes included in an entire segment can be controlled in such a manner to be a desired constant value.

However, for instance, in case where an object, which is not present in a previously processed frame, appears in a currently processed frame when performing the filtering processing, or in case where a motion of an object is complex, motion compensation cannot appropriately be performed in the inter-frames. A block, of which motion compensation is not appropriately performed, is not closely correlated with surrounding blocks. Consequently, when reproduction of an image is effected from data obtained by compression of the frame including such a block, there occurs a noise (hereunder sometimes referred to as a block noise) originating from such a block. More particularly, this results from the fact that when computing a sum of absolute values of data obtained as results of the filtering processing of data of such a block, a part of the thus obtained data corresponding to boundary picture elements of the block, which are not used in the orthogonal transform to be performed later on the data of each of the blocks, adjacent to another block to next be read is included in a computed value of the sum. This further increases a prediction error of a quantity of codes obtained as a result of the coding of the data of such a frame.

The present invention is accomplished to resolve such problems of the conventional image filtering system.

Accordingly, an object of the present invention is to provide an image filtering system which can significantly decrease a prediction error of a quantity of codes.

SUMMARY OF THE INVENTION

To achieve the foregoing object, in accordance with the present invention, there is provided an image filtering system which comprises a storage means for storing image data, a sum-of-products calculating means for reading data of a plurality of picture elements stored in the storage means every predetermined region (hereunder sometimes referred to as an object region) of a frame, for multiplying the data of each of the picture elements by a corresponding operator including a plurality of predetermined coefficients and for adding up results of the multiplication for each object region and for outputting a sum signal representing a sum of the products for each of the object regions, a sum-of-absolute-values calculating means for receiving the sum signals from said sum-of-products calculating means, for calculating absolute values of sums of the products represented by the received sum signals, for accumulating the calculated absolute values of the sums of the products for a frame and for outputting results of the accumulation, and an address selecting means for selecting addresses, at which the data of the picture elements read by the sum-of-products calculating means is stored, of the storage means in such a manner that image data stored at the selected addresses of the storage means do not include image data of boundary picture elements of adjoining ones of blocks into which the image data should be partitioned for an orthogonal transform.

More particularly, the address selecting means of the inventive image filtering system includes counter means for receiving the sum signals from the sum-of-products calculating means, for increasing a count by 1 upon each reception of the sum signal, for storing the increased count therein and for outputting a shift signal when the count is increased by 1; and address shifting means for receiving the shift signal from the counter means, for shifting a start address from which a reading of image data is started by a predetermined amount in response to the shift signal, for generating addresses of picture elements corresponding to an object region to next be accessed unless a storage area of the storage means corresponding to the object region includes boundary picture elements of both of the adjoining blocks, and for issuing to the counter means an incrementing signal for increasing the count stored in the counter means without generation of addresses if the storage area of the storage means corresponding to the object region includes the boundary picture elements of both of the adjoining blocks. In accordance with this facet of the invention, the counter means increases the count by 1 in response to the incrementing signal.

Thereby, can be prevented occurrence of a block noise originating from a block in which motion compensation is not appropriately performed. Consequently, a prediction error of a quantity of codes can be substantially decreased.

BRIEF DESCRIPTION OF THE DRAWINGS

Other features, objects and advantages of the present invention will become apparent from the following description of a preferred embodiment with reference to the drawings in which like reference characters designate like or corresponding parts throughout several views, and in which.

DETAILED DESCRIPTION OF THE PREFERRED EMBODIMENT

Hereinafter, a preferred embodiment of the present invention will be described in detail by referring to the accompanying drawings.

Figure 1:
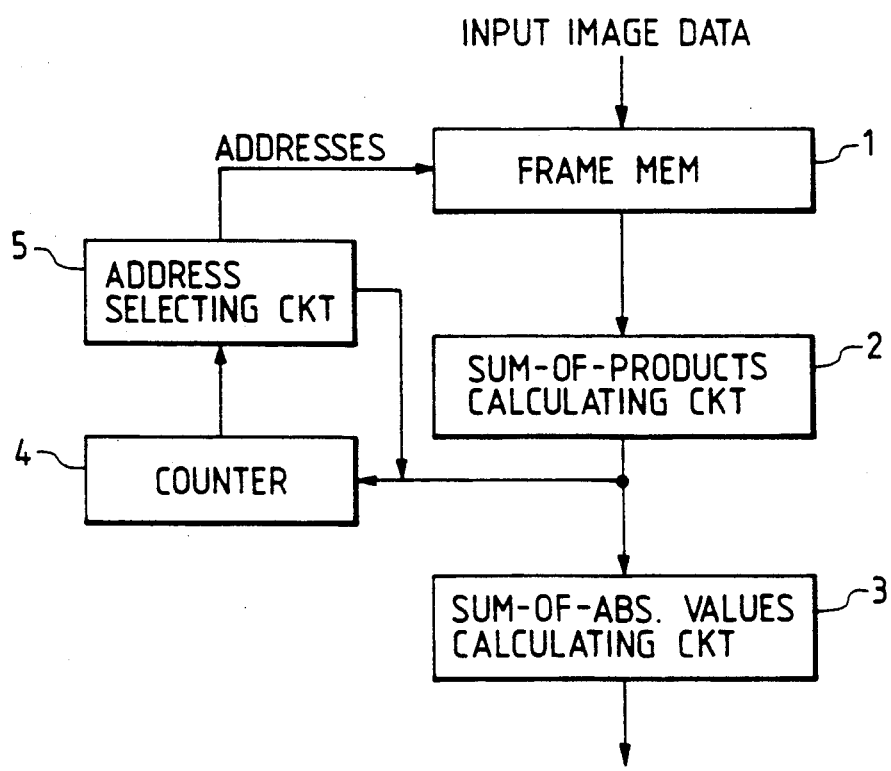
FIG. 1 is a schematic block diagram for showing the construction of an image filtering system embodying the present invention.
Figure 4:
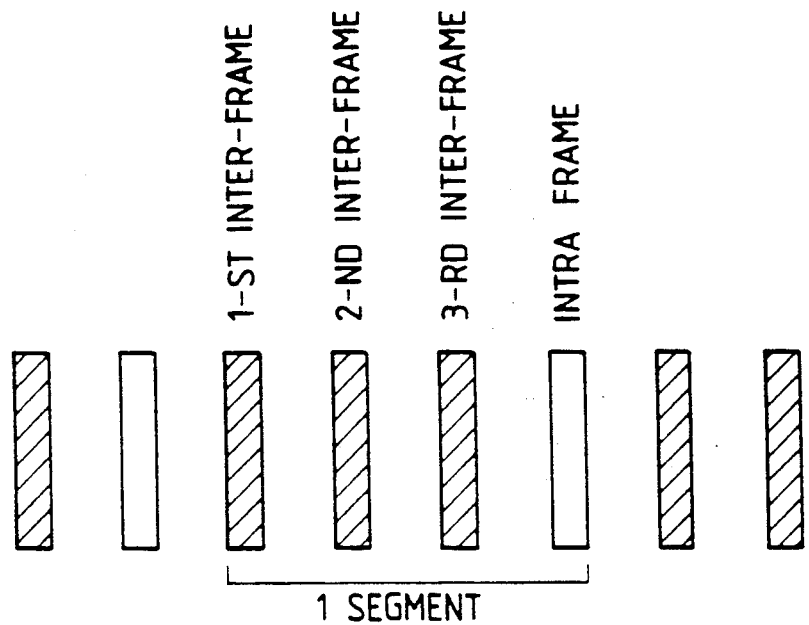
FIG. 4 is a diagram for illustrating a method for performing image data compression, which is employed in a conventional image filtering system.

Referring first to FIG. 1, there is shown the construction of an image filtering system embodying the present invention. In this figure, reference numeral 1 denotes a frame memory 1 for receiving and storing input image data; 2 a sum-of-products calculating circuit for reading data of a predetermined region (corresponding to an object region) of an image represented by the input image data and for performing a filtering processing; 3 a sum-of-absolute-values calculating circuit for receiving and calculating a sum of absolute values of outputs of the sum-of-products calculating circuit 2; 4 a counter for receiving and counting the outputs of the sum-of-products calculating circuit 2; 5 an address selecting circuit for receiving outputs of the counter 4, for generating addresses corresponding to a value of a count obtained by the counter 4, for outputting the generated addresses to the frame memory 1 and for issuing a signal (hereunder referred to simply as an incrementing signal) for incrementing the value of the count obtained in the counter 4 when the value of the count reaches a predetermined one.

Next, an operation of the image filtering system of FIG. 1 will be described in detail hereinbelow.

First, input image data are inputted to the frame memory 1. At that time, image data of one frame are written to the frame memory 1. Then, the image data stored in a predetermined storage area of the frame memory 1 corresponding to addressed generated by and inputted from the address selecting circuit 5 are read from the frame memory 1. The thus read data are inputted to the sum-of-products calculating circuit 2. Incidentally, the predetermined storage area of the frame memory 1 corresponds to an object region. Subsequently, in the circuit 2, the inputted data are multiplied by a corresponding operator including predetermined coefficients, and in addition results of the multiplication are added together. Thereafter, a result of the addition is outputted to the sum-of-absolute-values calculating circuit 3.

The sum-of-absolute-values calculating circuit 3 computes absolute values of the results of the addition inputted from the sum-of-products calculating circuit 2, and serially adds up the computed absolute values corresponding to data of one frame. Incidentally, an output of the sum-of-absolute-values calculating circuit 3 (namely, a result of the addition) is supplied to a standard code quantity converting circuit (not shown) wherein the supplied result of the addition is converted to a value of a predicted quantity of codes.

The output of the sum-of-products calculating circuit 2 is also fed to the counter 4. Then, the counter 4 counts the number of times of receiving the outputs of the sum-of-products calculating circuit 2 and outputs the value of the count to the address selecting circuit 5. Subsequently, the address selecting circuit 5 generates addresses corresponding to the value of the count received from the counter 4 and further outputs the generated addresses to the frame memory 1. As a result, the predetermined storage area of the frame memory 1 to be read is successively shifted in response to the count value of the counter 4. Namely, the object region is successively displaced in the frame.

The address selecting circuit 5, in which the number of picture elements composing a block and that of the coefficients of the operator are preliminarily stored, compares the value of the count outputted from the counter 4 with the preliminarily stored values, and outputs an incrementing signal to the counter 4 according to a result of the comparison.

This operation of the address selecting circuit 5 will be described in detail hereinafter by referring to FIGS. 2(a)-2(e).

In case of image data illustrated in FIGS. 2(a)-2(e), each of blocks B1 and B2 into which the image data is partitioned for an orthogonal transform is comprised of an array of 8×8 picture elements; and an operator is provided as an array of 1×5 coefficients.

Figure 2A:
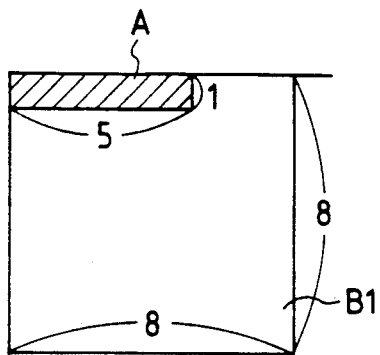
FIGS. 2(a) through 2(e) and 3(a) through 3(f) are diagrams for illustrating an operation of the image filtering system of FIG. 1.

As illustrated in FIG. 2(a), the address selecting circuit 5 first generates addresses assigned to, for instance, 1×5 data of a hatched region (corresponding to an object region) A located leftwardly and upwardly in the first block B1, as viewed in this figure. Then, the five data indicated by these addresses are read from the frame memory 1 and are inputted to the sum-of-products calculating circuit 2 wherein each of the five data is multiplied by a corresponding one of the five coefficients of the operator. Subsequently, five values respectively obtained as results of the multiplications (i.e., products) are added up therein, and thereafter a result of this addition is outputted therefrom to the sum-of-absolute-values calculating circuit 3. Further, the value of the count held in the counter 4 is increased by 1 every time the result of the addition effected in the circuit 2 (i.e., the sum) is outputted to the counter 4.

Figure 2B:
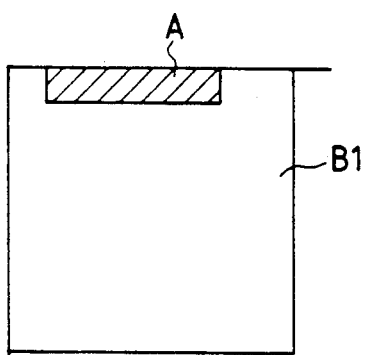

When the value of the count held in the counter 4 is increased by 1, the address selecting circuit 5 shifts each of addresses included in the hatched region corresponding to the object region A (hereunder sometimes referred to simply as the object region A) one place (corresponding to a picture element) to the right as illustrated in FIG. 2(b). Then, 1×5 data corresponding to addresses included in the thus updated object region A of FIG. 2(b) are inputted to the sum-of-products calculating circuit 2 wherein the inputted data are multiplied by the corresponding coefficients of the operator. Moreover, the five products thus obtained are added together, and a sum of these products is inputted to the sum-of-absolute-values calculating circuit 3 which further computes an absolute value of the inputted sum and adds the computed absolute value to the sum of the absolute values, which is previously calculated and stored therein.

Figure 2C:
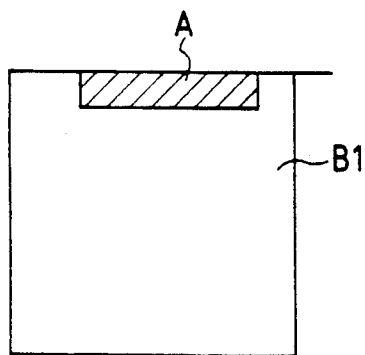

When the sum-of-products calculating circuit 2 outputs the new sum of the products, the value of the count held in the counter 4 is increased by 1 once again. As a result of this, each of the addresses of the current object region A of FIG. 2(b) is shifted one place (corresponding to a picture element) to the right, as illustrated in FIG. 2(c).

Figure 2D:
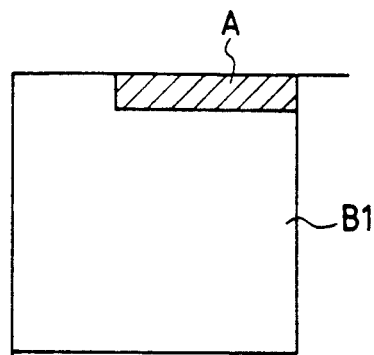
Figure 2E:
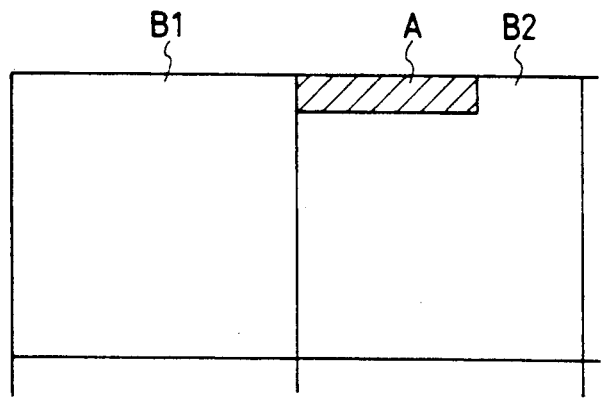

After that, similar operations are repeatedly carried out. When a rightmost address of the current object region A is matched with an address of a boundary of the block B1 as shown in FIG. 2(d), the address selecting circuit 5 outputs an incrementing signal to the counter 4 without generating addresses at the next increment of the value of the count held in the counter 4, so that the count stored in the counter 4 is increased by 1. Since then, only the incrementing of the count held in the counter 4 is repeated without generation of addresses until the left end of the region A reaches the left boundary of the block B2. Namely, the generation of addresses is controlled such that each object region A does not spread over adjoining blocks into which the image data are partitioned for an orthogonal transform, whereby each sum of the products is derived from data of only a single block.

Referring next to FIGS. 3(a)-3(f) there is shown another case in which each block for an orthogonal transform is composed of an array of 4×4 picture elements of image data, and an operator is made up of an array of 3×3 coefficients.

Figure 3A:
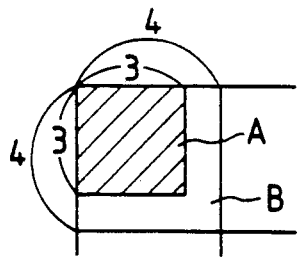
Figure 3B:
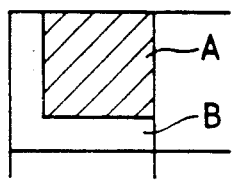
Figure 3C:
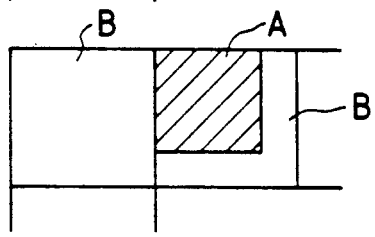
Figure 3D:
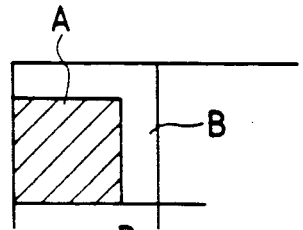
Figure 3E:
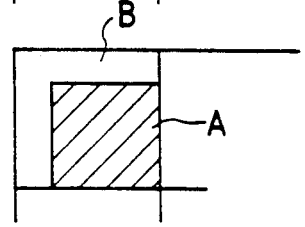

In this case, an object region A is serially shifted one place (corresponding to a picture element) to the right as illustrated in FIGS. 3(a) to 3(c). Further, when the right end of the object region A reaches a right boundary of a rightmost block of a top row of the image data, the object region A is shifted one place (corresponding to a picture element) to the bottom. Moreover, a reading of image data is once again started from a leftmost block of the top row of the image data by shifting the object region A from a leftmost position to the right as illustrated in FIGS. 3(d) and 3(e).

Figure 3F:
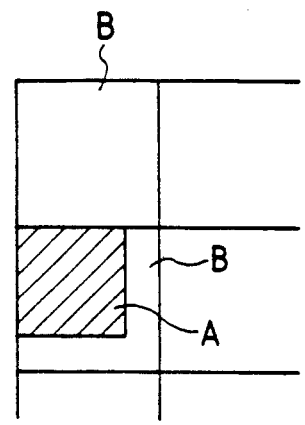

When such an operation of reading image data of the blocks of the top row is completed, a similar operation of reading image data of blocks of the next row is performed as illustrated in FIG. 3(f). However, during these operations of reading image data, the generation of addresses is controlled such that each object region A does not spread over adjoining blocks into which the image data are partitioned for an orthogonal transform, whereby each sum of the products is derived from data of only a single block B, similarly to FIGS. 2(a)-2(e).

While a preferred embodiment of the present invention has been described above, it is to be understood that the present invention is not limited thereto and that other modifications will be apparent to those skilled in the art without departing from the spirit of the invention. For example, in the above described embodiment, a unit of an amount of shift of the object region A is not limited to one place (corresponding to a picture element) but may be more than one place, for instance, two places (two picture elements) or three places (three picture elements). Further, in cases of the operations of the above described embodiment explained by referring to FIGS. 2(a) through 2(e) and 3(a) through 3(f), the operation of reading image data of an entire input image is performed by serially shifting the object region A in the direction of a row, namely, in the horizontal direction as viewed in the figures. However, an operation of reading image data of an entire input image may be effected by moving the object region A in each block (namely, after all of image data corresponding to addresses of a block are read, image data corresponding to addresses of the next block are read).

The scope of the present invention, therefore, is to be determined solely by the appended claims.

What is claimed is:

1. An image filtering system comprising:

storage means for storing image data representing an entire input image therein, the image data being partitioned into blocks for an orthogonal transform, each of the blocks being composed of a predetermined number of picture elements;

address selecting means for selecting addresses of said storage means, from which image data corresponding to respective object regions and stored at the selected addresses are read, each of said object regions being a predetermined region of a frame; and sum-of-products calculating means for multiplying each of the image data of picture elements read out of said storage means by a corresponding coefficient of an operator, which is comprised of a predetermined number of coefficients, for adding up the thus obtained products for each of the object regions and for outputting a sum signal representing a sum of the products for each of the object regions, wherein said address selecting means selects the addresses such that a storage area of said storage means corresponding to each of the object regions does not spread over adjoining ones of the blocks, and wherein said address selecting means comprises:

counter means for receiving the sum signals from said sum-of-products calculating means, for increasing a count by 1 every reception of the sum signal, for storing the increased count therein and for outputting a shift signal when the count is increased by 1; and address shifting means for receiving the shift signal from said counter means, for shifting a start address, from which a reading of image data is started, by a predetermined amount in response to the shift signal, for generating addresses of picture elements corresponding to an object region to next be accessed unless a storage area of said storage means corresponding to the object region include boundary picture elements of both of the adjoining blocks, and for issuing to said counter means an incrementing signal for increasing the count stored in said counter means without generation of addresses if the storage area of said storage means corresponding to the object region includes the boundary picture elements of both of the adjoining blocks, said counter means increasing the count by 1 in response to the incrementing signal.

2. An image filtering system comprising:

storage means for storing image data representing an entire input image therein, the image data being partitioned into blocks for an orthogonal transform, each of the blocks being composed of a predetermined number of picture elements;

address selecting means for selecting addresses of said storage means, from which image data corresponding to respective object regions and stored at the selected addresses are read, each of said object regions being a predetermined region of a frame;

sum-of-products calculating means for multiplying each of the image data of picture elements read out of said storage means by a corresponding coefficient of an operator, which is comprised of a predetermined number of coefficients, for adding up the thus obtained products for each of the object regions and for outputting a sum signal representing a sum of the products for each of the object regions; and sum-of-absolute-values calculating means for receiving the sum signals from said sum-of-products calculating means, for calculating absolute values of sums of the products represented by the received sum signals, for accumulating the calculated absolute values of the sums of the products for a frame and for outputting results of the accumulation, wherein said address selecting means selects the addresses such that image data stored at the selected addresses of said storage means do not include image data of boundary picture elements of adjoining ones of the blocks.

* * * * *